(12) United States Patent
Schmidt et al.

(10) Patent No.: US 10,487,864 B2
(45) Date of Patent: Nov. 26, 2019

(54) MOUNTING SYSTEMS INCLUDING LOAD-BEARING ATTACHMENT ASSEMBLIES AND METHODS FOR MOUNTING STRUCTURES TO AN AIRCRAFT

(71) Applicant: GOODRICH CORPORATION, Charlotte, NC (US)

(72) Inventors: Ryan Schmidt, Gilbert, AZ (US); James Baglini, Jr., Chandler, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 606 days.

(21) Appl. No.: 15/040,197

(22) Filed: Feb. 10, 2016

(65) Prior Publication Data
US 2017/0225793 A1   Aug. 10, 2017

(51) Int. Cl.
*F16B 5/02* (2006.01)
*F16B 5/06* (2006.01)
*F16B 5/01* (2006.01)

(52) U.S. Cl.
CPC .............. *F16B 5/0621* (2013.01); *F16B 5/01* (2013.01)

(58) Field of Classification Search
CPC .............. F16B 5/01; F16B 5/02; Y10T 16/05
USPC ............................. 411/546, 338; 16/2.1, 2.4
See application file for complete search history.

(56) References Cited

U.S. PATENT DOCUMENTS

| | | | | |
|---|---|---|---|---|
| 1,967,039 | A * | 7/1934 | Mohr | F16B 37/122 223/1 |
| 2,430,613 | A * | 11/1947 | Hodge | B25B 5/08 101/386 |
| 2,700,172 | A * | 1/1955 | Rohe | F16B 5/01 16/2.1 |
| 2,883,012 | A * | 4/1959 | Hoffman | F16B 5/02 403/408.1 |
| 2,957,196 | A * | 10/1960 | Delgadillo | F16B 5/01 16/2.1 |
| 3,252,493 | A * | 5/1966 | Smith | F16B 5/01 285/222 |
| 4,010,519 | A * | 3/1977 | Worthing | F16B 19/10 403/404 |
| 4,232,496 | A * | 11/1980 | Warkentin | F16B 19/10 16/2.1 |

(Continued)

*Primary Examiner* — Flemming Saether
(74) *Attorney, Agent, or Firm* — Snell & Wilmer L.L.P.

(57) ABSTRACT

A load-bearing attachment assembly is provided for mounting a structure to an aircraft. The load-bearing attachment assembly comprises a male fastening component and a female fastening component. The male fastening component comprises a radially-extending head, a first aperture, and a cylindrical portion extending perpendicular to the radially-extending head. The cylindrical portion has a first threaded portion circumferentially disposed on an outer surface of the cylindrical portion. The radially-extending head comprises a first clamping surface. The female fastening component comprises an annulus enclosing a second aperture, a second clamping surface disposed on the annulus, and a second threaded portion circumferentially disposed on an inner surface perpendicular to the second clamping surface. The first aperture and the second aperture are configured for a fastener to extend therethrough. In response to rotation of the fastener, first clamping surface translates toward second clamping surface.

8 Claims, 11 Drawing Sheets

(56) References Cited

U.S. PATENT DOCUMENTS

| | | | | |
|---|---|---|---|---|
| 4,296,586 A | * | 10/1981 | Heurteux | F16B 5/01 411/338 |
| 4,375,877 A | | 3/1983 | Shorey | |
| 4,689,928 A | * | 9/1987 | Dutton | E04F 13/081 403/143 |
| 4,981,735 A | * | 1/1991 | Rickson | F16B 5/01 156/92 |
| 5,147,167 A | * | 9/1992 | Berecz | F16B 5/01 411/339 |
| 5,860,778 A | * | 1/1999 | Keener | B23P 19/065 29/428 |
| 6,264,412 B1 | * | 7/2001 | Nakamura | F16B 5/01 411/107 |
| 6,430,894 B1 | * | 8/2002 | Chae | E06B 3/5436 52/786.1 |
| 7,467,764 B2 | | 12/2008 | Hintzman | |
| 7,755,876 B2 | | 7/2010 | Morrill | |
| 8,393,601 B2 | * | 3/2013 | de Mola | F16B 5/01 267/141.5 |
| 8,474,759 B2 | | 7/2013 | Keener | |
| 8,757,665 B2 | * | 6/2014 | Drapes | A63C 11/00 280/809 |
| 8,777,537 B2 | * | 7/2014 | Fritsch | F16B 5/02 411/338 |
| 8,914,979 B2 | | 12/2014 | Venskus et al. | |
| 9,156,538 B1 | | 10/2015 | Stern et al. | |
| 9,822,808 B2 | * | 11/2017 | Rajeev | F16B 37/044 |
| 2003/0223841 A1 | * | 12/2003 | Brettschneider | D21D 5/16 411/403 |
| 2004/0265091 A1 | * | 12/2004 | Cheung | B29C 65/54 411/338 |
| 2006/0182513 A1 | * | 8/2006 | Dortch | F16B 23/0061 411/338 |
| 2011/0162165 A1 | | 7/2011 | Schumacher, Jr. et al. | |
| 2014/0321941 A1 | * | 10/2014 | Hufenbach | F16B 5/01 411/337 |
| 2016/0340050 A1 | * | 11/2016 | Schmidt | B64D 25/14 |

\* cited by examiner

SECTION A-A

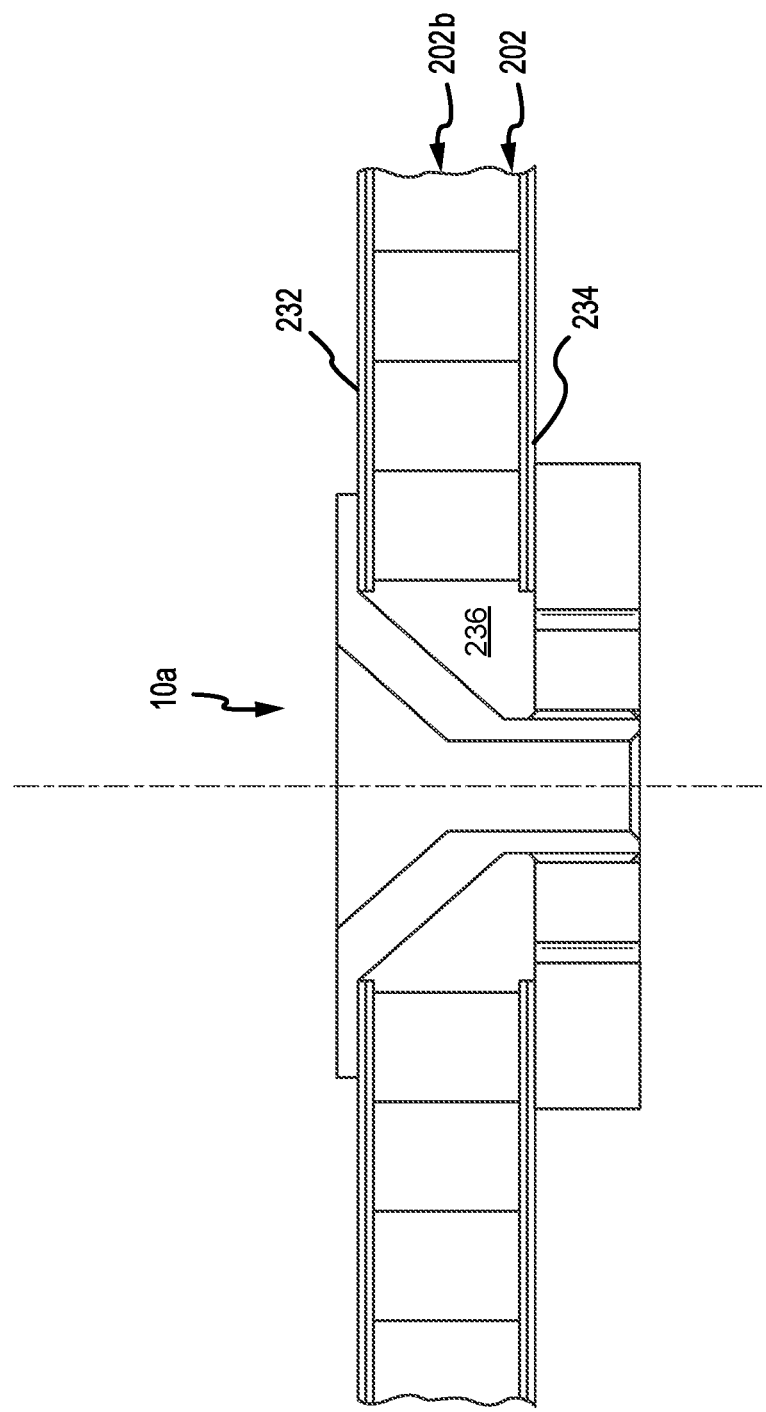

MOUNTING SYSTEMS INCLUDING LOAD-BEARING ATTACHMENT ASSEMBLIES AND METHODS FOR MOUNTING STRUCTURES TO AN AIRCRAFT

FIELD

The present disclosure relates generally to aircraft exteriors. More particularly, the present disclosure relates to mounting systems including load-bearing attachment assemblies and methods for mounting structures to an aircraft.

BACKGROUND

Commercial aircraft may include structures mounted into openings in the aircraft (e.g., openings in an aircraft exterior), such as fuselage-mounted structures. For example, a fuselage-mounted packboard compartment used to stow an inflatable evacuation slide may be mounted into a fuselage opening. Other fuselage-mounted structures include, for example, panels and compartments of various thicknesses used to form the aircraft skin. Such fuselage-mounted structures benefit from being securely mounted using a low weight device, while tending to reduce wear and abrasion of an aircraft mounting surface.

The mounting of fuselage-mounted structures comprised of composite material is particularly challenging because the composite material is susceptible to damage caused by the crushing force of conventional load-bearing fasteners and the ability to fabricate sustainable threads and grooves into the composite material has been elusive. Other conventional methods for mounting the structures to the aircraft exterior including the fuselage have involved adding mass to build the structures themselves, at the expense of additional weight, and then mounting the built structure directly to the aircraft exterior, but such an arrangement undesirably places load bearing forces load directly on the structure itself.

SUMMARY

A load-bearing attachment assembly is provided for mounting a structure to an aircraft, according to various embodiments. The load-bearing attachment assembly comprises a male fastening component and a female fastening component. The male fastening component comprises a radially-extending head, a first aperture, and a cylindrical portion extending perpendicular to the radially-extending head. The cylindrical portion has a first threaded portion circumferentially disposed on an outer surface of the cylindrical portion. The radially-extending head comprises a first clamping surface. The female fastening component comprises an annulus enclosing a second aperture, a second clamping surface disposed on the annulus, and a second threaded portion circumferentially disposed on an inner surface perpendicular to the second clamping surface. The first aperture and the second aperture are configured for a fastener to extend therethrough. In response to rotation of the fastener, the first clamping surface translates toward second clamping surface.

A mounting system for mounting a structure to an aircraft is provided, according to various embodiments. The mounting system comprises a male fastening component and a female fastening component. The male fastening component comprises a radially-extending head, a first aperture, and a cylindrical portion extending perpendicular to the radially-extending head. The cylindrical portion has a first threaded portion circumferentially disposed on an outer surface of the cylindrical portion. The radially-extending head comprises a first clamping surface. The female fastening component comprises an annulus enclosing a second aperture, a second clamping surface disposed on the annulus, and a second threaded portion circumferentially disposed on an inner surface perpendicular to the second clamping surface. The female fastening component is configured to be cooperatively engaged with the male fastening component by a fastener that extends through the male fastening component, the female fastening component, and a mounting portion of the structure and into the aircraft where it is secured.

A method for mounting a structure to an aircraft is provided, according to various embodiments. The method comprises inserting, from a first side of a mounting portion of the structure, a first threaded portion of a male fastening component through a mounting opening in the mounting portion. A female fastening component to be cooperatively engaged with the male fastening component is positioned from a second side of the mounting portion. A fastener is passed through respective aligned first and second apertures in the male fastening component and the female fastening component and into the aircraft. The fastener is rotatably tightened to cooperatively engage the male fastening component and the female fastening component to clamp the mounting portion between a first clamping surface of the male fastening component and a second clamping surface of the female fastening component and mount the structure to the aircraft with the female fastening component disposed against the aircraft and provide a load-bearing mounting platform for the structure. The fastener is secured inside the aircraft.

In any of the foregoing embodiments, the first threaded portion is cooperatively engaged with the second threaded portion of the female fastening component. The male fastening component comprises a countersunk threaded screw having the radially-extending head comprising one of a flat head or a domed head, wherein an inboard surface of the radially-extending head comprises the first clamping surface. An outboard side of the annulus comprises the second clamping surface, wherein the first threaded portion of the male fastening component and the second threaded portion of the female fastening component have complementary threads configured for cooperative engagement. The male fastening component is configured to be at least partially positioned on a first side of a mounting portion of the structure and the female fastening component is configured to be at least partially positioned on a second side of the mounting portion. The first clamping surface of the male fastening component and the second clamping surface of the female fastening component are configured for clamping the mounting portion therebetween upon mounting the structure to the aircraft, thereby transferring load to the female fastening component that is disposed against the aircraft. The female fastening component further comprises an annular shoulder extending outboard from the annulus wherein a transition between the annulus and the annular shoulder provides a corner for positioning the second side of the mounting portion into the corner and against the outboard side of the annulus. The mounting portion comprises a substantially flat mounting portion including a mounting opening that extends from the first side to the second side thereof. The first aperture and the second aperture are aligned with the mounting opening and configured for a fastener to extend therethrough from the first side of the mounting portion and into the aircraft where the fastener is secured. The structure comprises at least one of a panel or a compartment. The structure comprises a packboard compartment and the mounting portion comprises a flange portion of the packboard compartment.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 10 illustrates another sectional view of a male fastening component and a female fastening component of a load-bearing attachment assembly of FIGS. 1 and 2 according to various embodiments.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Various embodiments are directed to mounting systems including a load-bearing attachment assembly and methods for mounting structures to an aircraft using the same. Various embodiments permit the secure mounting of structures having a wide variation in thickness and type of core portion. Various embodiments substantially prevent wear/abrasion of an aircraft mounting surface of the structure. Various embodiments create a lightweight and large surface area load-bearing mounting platform for the mounted structure. As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
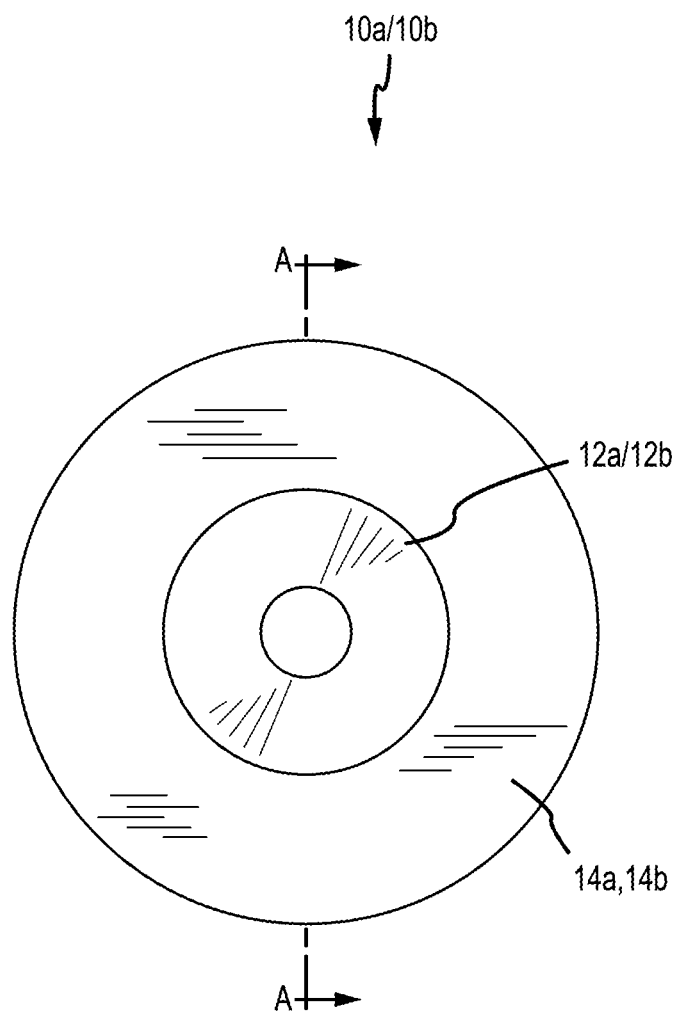
FIG. 1 is a top view of a load-bearing attachment assembly of a mounting system for mounting a structure to an aircraft, according to various embodiments.
Figure 2:
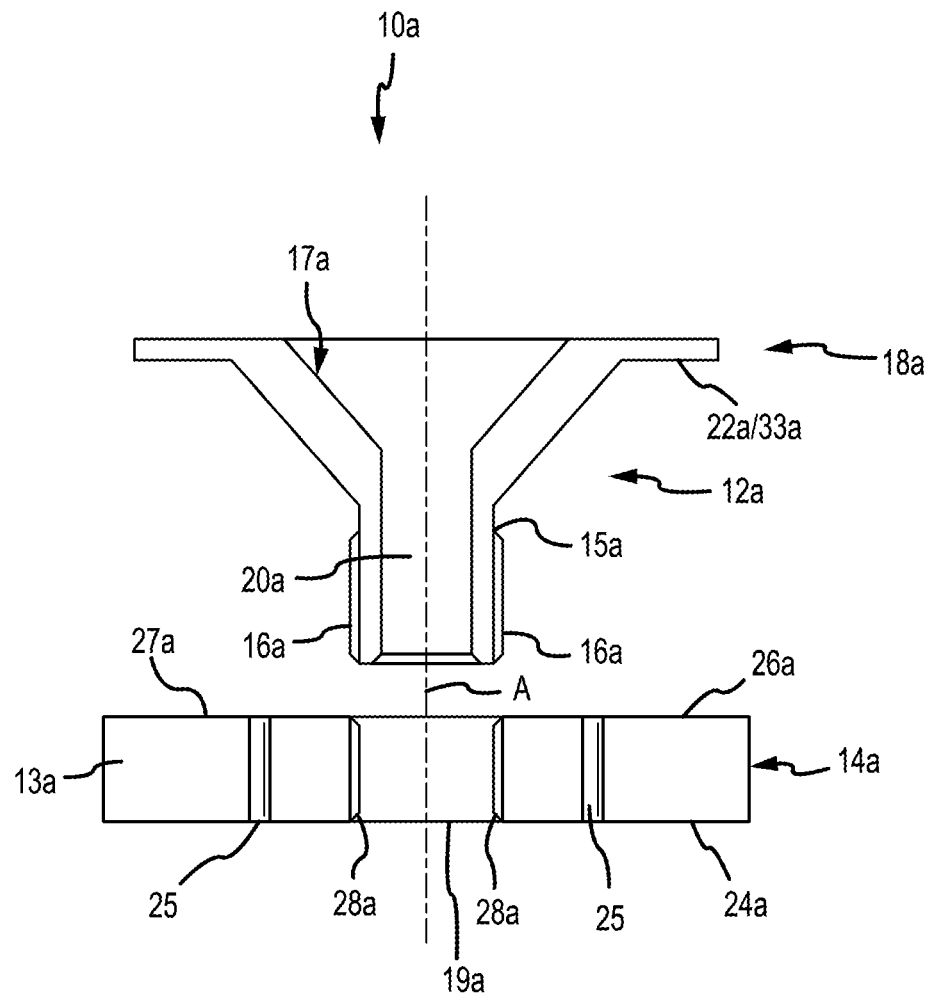
FIG. 2 is a sectional view of a male fastening component and a female fastening component of a load-bearing attachment assembly (in non-engaged condition) taken along the line A-A of FIG. 1, according to various embodiments.
Figure 3:
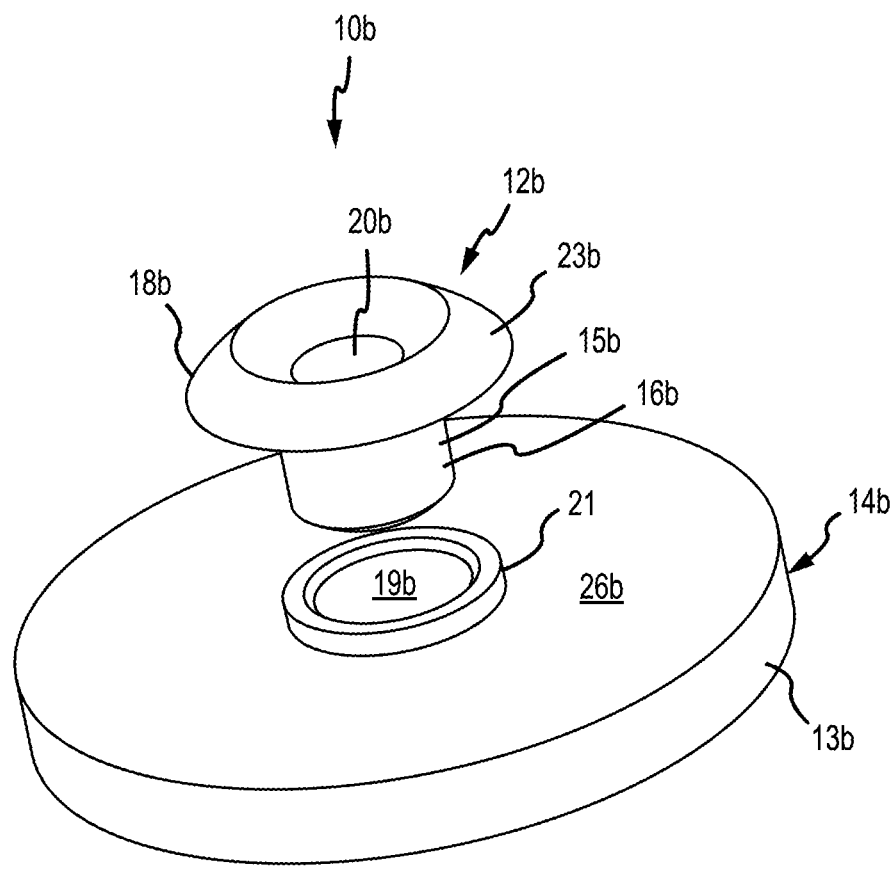
FIG. 3 is an isolation view of another load-bearing attachment assembly (in a non-engaged condition), according to various embodiments.
Figure 4:
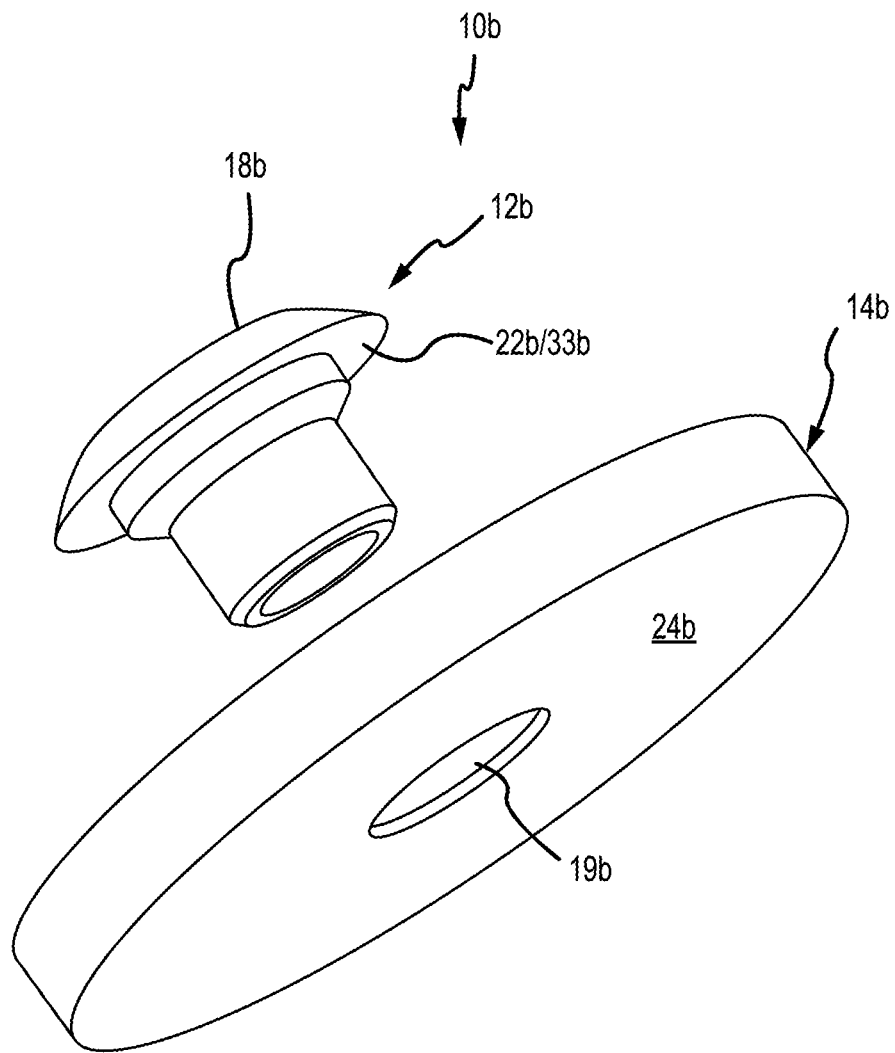
FIG. 4 is another view of the load-bearing attachment assembly of FIG. 3, according to various embodiments.
Figure 5:
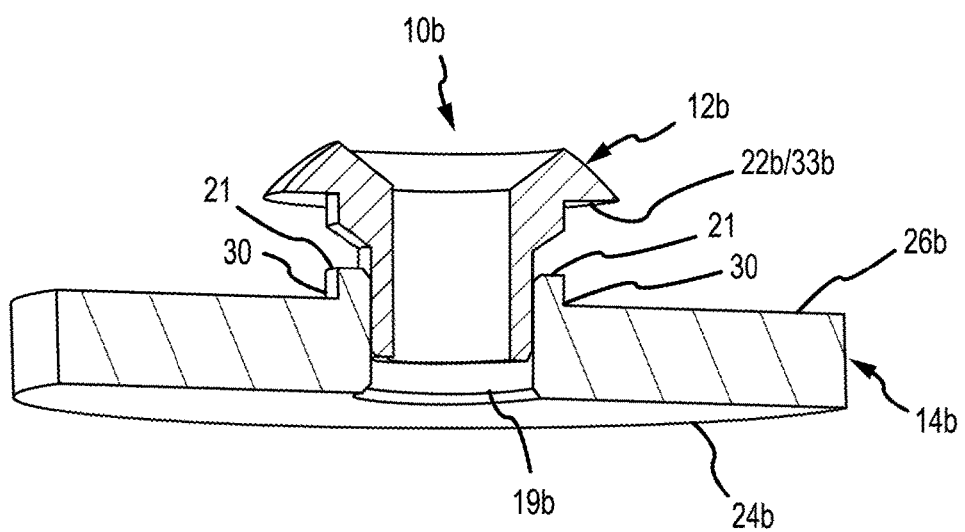
FIG. 5 is a sectional view of the load-bearing attachment assembly of FIGS. 3 and 4, illustrating the male fastening component cooperatively engaged with the female fastening component, according to various embodiments.
Figure 6:
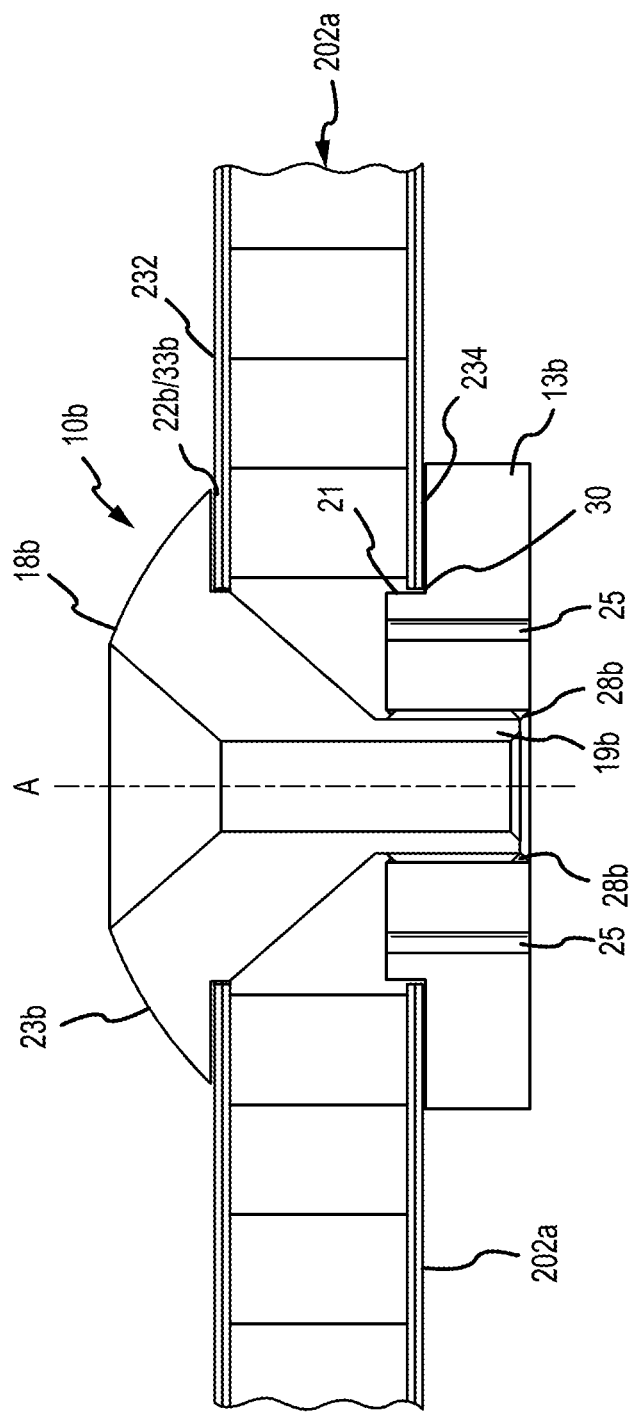
FIG. 6 is another sectional view of the load-bearing attachment assembly of FIGS. 3 through 5, illustrating the load-bearing attachment assembly at least partially disposed in a mounting opening in a mounting portion of the structure (a composite panel in the depicted embodiment) and the mounting portion clamped between a first clamping surface of the male fastening component and a second clamping surface of the cooperating female fastening component, according to various embodiments.
Figure 9:
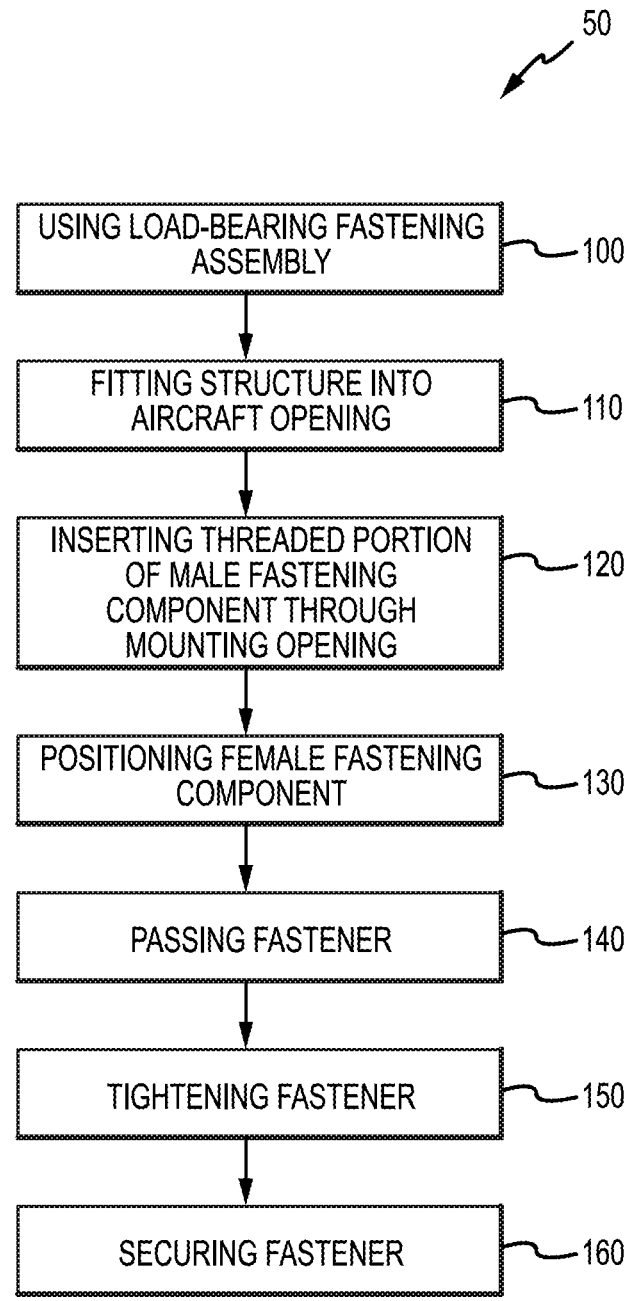
FIG. 9 illustrates a flow diagram of a method for mounting a structure to an aircraft using a load-bearing attachment assembly, according to various embodiments.

Referring to FIGS. 1, 2, and 9, according to various embodiments, a method 50 for mounting a structure to an aircraft may comprise using a load-bearing attachment assembly 10a (FIGS. 1 and 2) or 10b (FIGS. 3 through 6) (step 100). Referring specifically to FIG. 2, according to various embodiments, the load-bearing attachment assembly 10a comprises a male fastening component 12a and a cooperating female fastening component 14a. The male fastening component 12a and the cooperating female fastening component 14a each comprise a metallic material. The male fastening component 12a may comprise a radially-extending head (flange) 18a, a first aperture 20a, and a cylindrical portion extending perpendicular to the radially-extending head. The cylindrical portion has a a first threaded portion 15a comprising a plurality of threads 16a. The first threaded portion is circumferentially disposed on an outer surface of the cylindrical portion. The radially-extending head 18a comprises a first clamping surface 33a. For example, in the depicted embodiment, the male fastening component 12a is configured as a countersunk threaded screw having a flat head. FIG. 2 illustrates a cross-section of the countersunk threaded screw with a chamfer angle 17a of 100 degrees, but various chamfer angles may be used. The male fastening component 12a has the first aperture 20a defined therein. An inboard surface 22a of the flat head 18a of the male fastening component 12a may comprise the first clamping surface 33a for purposes as herein described.

Still referring to FIG. 2, according to various embodiments, the female fastening component 14a comprises an annulus 13a, i.e., a circular disk with a center opening 19a (referred to herein as a "second aperture"). The annulus encloses the second aperture 19a. A second clamping surface is disposed on the annulus 13a. The first aperture 20a of the male fastening component and the second aperture 19a are configured to be aligned and each has a medial axis A passing through each center. The female fastening component 14a has an inboard side 24a configured to be disposed against the aircraft (with momentary reference to FIG. 8A) and an outboard side 26a configured to provide a load-bearing mounting platform for the structure. The outboard side 26a may have a knurled surface 27a for purposes as herein described. The second aperture 19a in the female fastening component 14a includes a second threaded portion including female threads 28a for cooperative engagement with the male threads 16a of the male fastening component 12a. The second threaded portion is circumferentially disposed on an inner surface perpendicular to the second clamping surface. Thus, the male fastening component and the female fastening component have complementary threads for cooperative engagement or attachment with each other as herein described.

Referring again to FIG. 1 and now to FIGS. 3 through 6, according to various embodiments, a load-bearing attachment assembly 10b comprises a male fastening component 12b and a cooperating female fastening component 14b. The male fastening component 12b and the cooperating female fastening component 14b each comprise a metallic material. The male fastening component 12b may comprise a radially-extending head (flange) 18b, a first aperture 20b, and a cylindrical portion extending perpendicular to the radially-extending head. The cylindrical portion has a first threaded portion 15b comprising a plurality of threads 16b. The first threaded portion 15b is circumferentially disposed on an outer surface of the cylindrical portion. The radially-extending head 18b comprises a first clamping surface 33b. For example, in the depicted embodiment, the male fastening component 12b is configured as a countersunk threaded screw having a domed outboard surface 23b with an inboard surface 22b of the head 18b comprising the first clamping surface 33b in the same manner as the head 18a of male fastening component 12a.

Still referring to FIGS. 3 through 6, according to various embodiments, the female fastening component 14b comprises an annulus 13b, i.e., a circular disk with a center opening 19b (referred to herein as "second aperture 19b"). The female fastening component 14b of load-bearing attachment assembly 10b further comprises an annular shoulder 21 extending outboard from the annulus 13b wherein a transition between the annulus 13b and the annular shoulder 21 provides a corner 30 for positioning a second side 232 of the mounting portion 200 of the structure 202 into the corner 30 and against the outboard side of the annulus. The first aperture 20b of the male fastening component and the second aperture are configured to be aligned and each has a medial axis A passing through each center. The female fastening component 14b has an inboard side 24b configured to be disposed against the aircraft (FIG. 9) and an outboard side 26b configured to provide a load-bearing mounting platform for the structure. At least a portion of the second aperture 19b in the female fastening component 14b includes female threads 28b for cooperative engagement with the male threads of the male fastening component. While illustrated load-bearing attachment assembly 10a comprises male fastening component 12a with a countersunk threaded screw having a radially-extending head (flat head 18a) and annulus 13a and illustrated load-bearing attachment assembly 10b comprises a countersunk threaded screw with a domed head 18b and a female fastening component 14b comprising an annulus 13b with an annular shoulder 21, it is to be understood that the countersunk threaded screw having a flat head may be used with a female fastening component having a shoulder and the countersunk threaded screw with a domed head may be used with the annulus without the shoulder. Both annuli 13a and 13b may include openings 25 (FIGS. 2 and 6) for use with a tool for tightening the female fastening component around the threaded portion of the male fastening component.

The structure 202 configured to be mounted within an opening (with momentary reference to FIG. 8) in the wall of the aircraft (e.g., a fuselage opening) using the load-bearing attachment assembly may comprise the panel (such as panel 202a shown in FIG. 6), a door, a compartment (such as the packboard compartment 202b of FIGS. 7 through 8), or the like. The structure may comprise at least one of a composite material, solid laminate, or the like. Whether made from a composite material, a solid laminate, or another material, the load-bearing attachment assembly 10a or 10b according to various embodiments may be used for mounting the structure within the opening to prevent damage to the structure that may otherwise be caused by the crushing force of conventional fasteners. For example, composite material often includes a honeycomb core portion that is relatively soft relative to other portions of the composite material but provides desirable stiffness to the composite material. The honeycomb core portion is particularly susceptible to crushing forces of conventional fasteners. It is also to be understood that fuselage-mounted structures made from materials other than a composite material may benefit from various embodiments.

Figure 7:
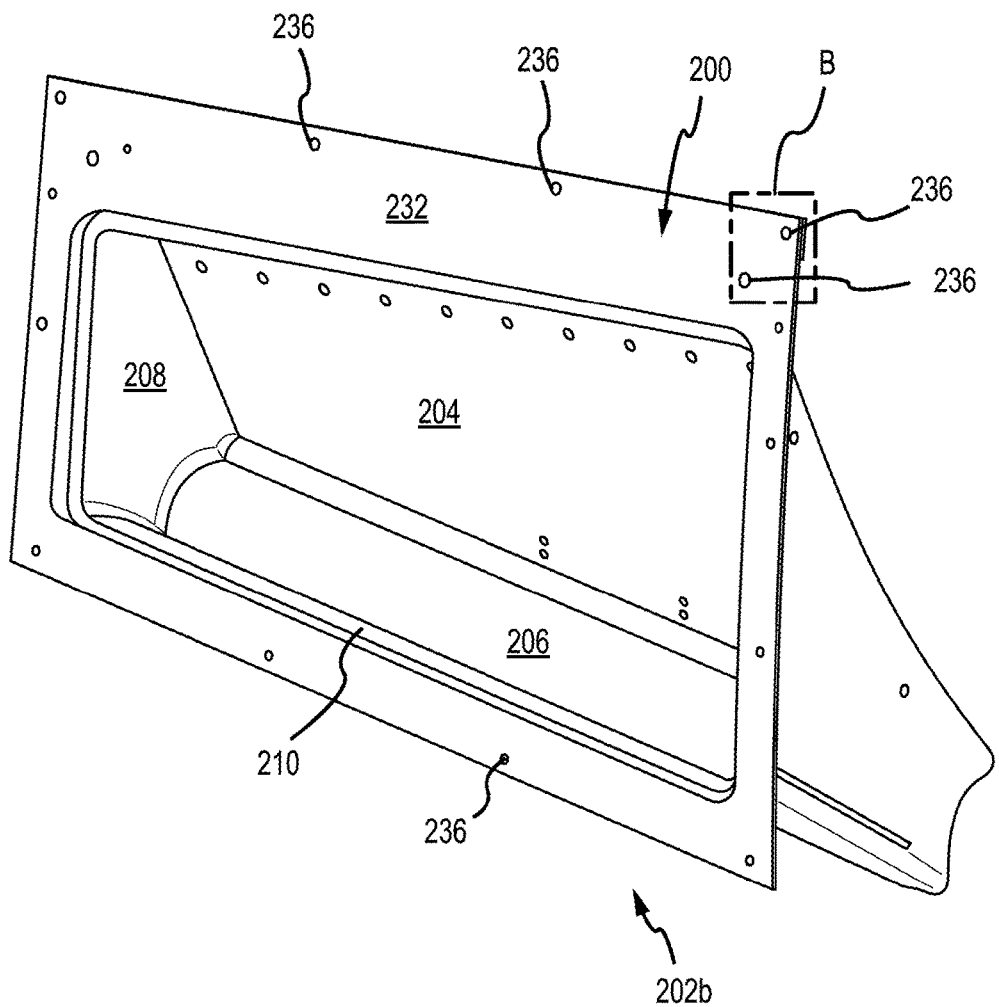
FIG. 7 is a perspective view of an exemplary structure (a packboard compartment in the depicted embodiment) configured to be mounted within a fuselage opening using the load-bearing attachment assembly of FIG. 2 or FIGS. 3 through 6, according to various embodiments.
Figure 7A:
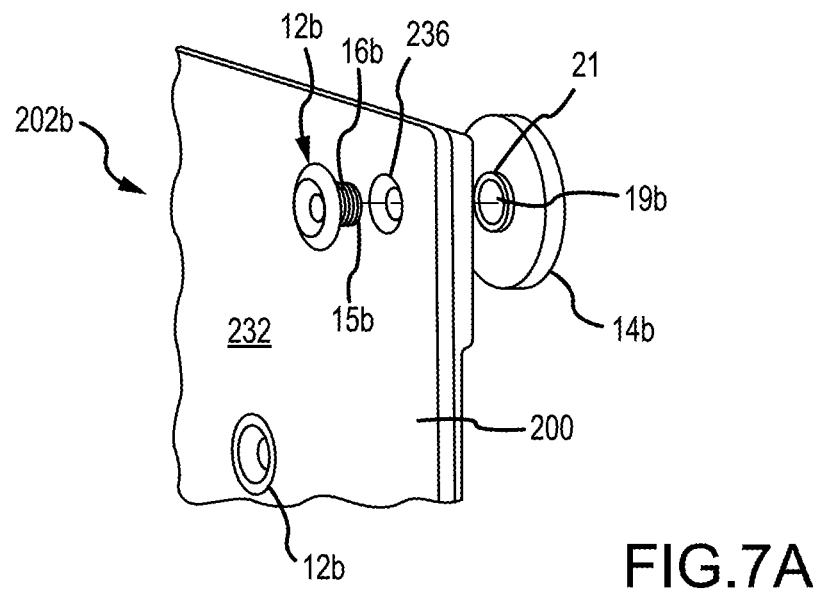
FIGS. 7A and 7B are enlarged views of an encircled region B on a flange portion (an exemplary mounting portion) of the packboard compartment of FIG. 7, illustrating engagement of the load-bearing attachment assembly of FIGS. 3 through 6 through the mounting opening of an exemplary pair of mounting openings in the flange portion, according to various embodiments.
Figure 7B:
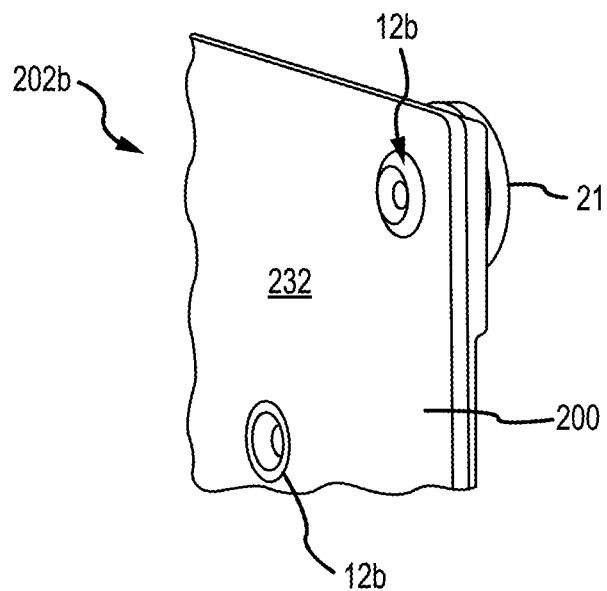

Referring now specifically to FIG. 7, according to various embodiments, an exemplary packboard compartment 202b configured to be mounted within a fuselage opening is depicted. FIG. 8A depicts the fuselage-mounted packboard compartment. The packboard compartment may be mounted within the fuselage opening in the aircraft over a wing such that passengers exiting an emergency exit door would exit onto the wing. An inflatable evacuation slide may be stowed within the packboard compartment. The packboard compartment 202b depicted in FIGS. 7 and 8 generally comprises a rigid enclosure comprising an inner surface 204 having rear and lateral sides 206 and 208 and an open end 210 configured to be covered by a releasable access panel 212. The rigid enclosure includes a flange portion as the mounting portion 200 that extends outwardly around the perimeter of the open end 210 of the rigid enclosure. The forward edges of the packboard compartment lateral sides extend upwardly from the packboard compartment second side and are angularly directed toward the packboard compartment second side. The mounting portion 200 (exemplified by flange portion) is substantially flat and includes the first side 232 and an opposing second side 234 with one or more mounting openings 236 extending from the first side 232 to the opposing second side 234. While FIGS. 7, 7A, and 7B depict only an exemplary number of mounting openings in the flange portion and in encircled region B, it is to be understood that the number of mounting openings 236 may vary from that depicted. The first side 232 of the flange portion (the exemplary mounting portion 200) corresponds to a first side of the structure 202. The first side of the structure (and the flange portion) faces outboard of the aircraft. The opposing second side 234 of the flange portion corresponds to a second side of the structure (and the flange portion). The one or more mounting openings 236 are used for installation of one or more load-bearing attachment assemblies as herein described.

Still referring to FIGS. 7 through 8B and again to FIG. 9, according to various embodiments, the method 50 for mounting a structure to the aircraft exterior continues by fitting at least a portion of the structure into the opening in the aircraft (for example, a "fuselage opening") (step 110). The structure intrudes into the exterior opening (e.g., the fuselage opening) of the aircraft. The packboard compartment 202b may be mounted within the fuselage opening with the open end 210 and mounting portion 200 (the flange portion in the depicted embodiment) substantially flush with the exterior or outer surface 240 of the aircraft. The flange portion forms the skin or airflow surface of the aircraft.

Figure 8B:
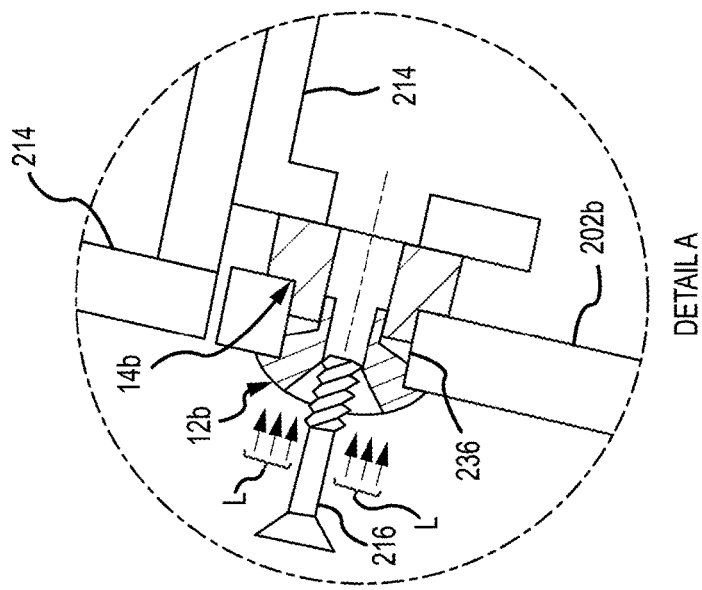
FIG. 8A illustrates the packboard compartment of FIG. 7 mounted in a fuselage opening in an aircraft by the load-bearing attachment assembly of FIGS. 3 through 6 and FIG. 8B is an enlarged detailed view of the load-bearing attachment assembly of FIG. 8A, according to various embodiments.
Figure 8A:
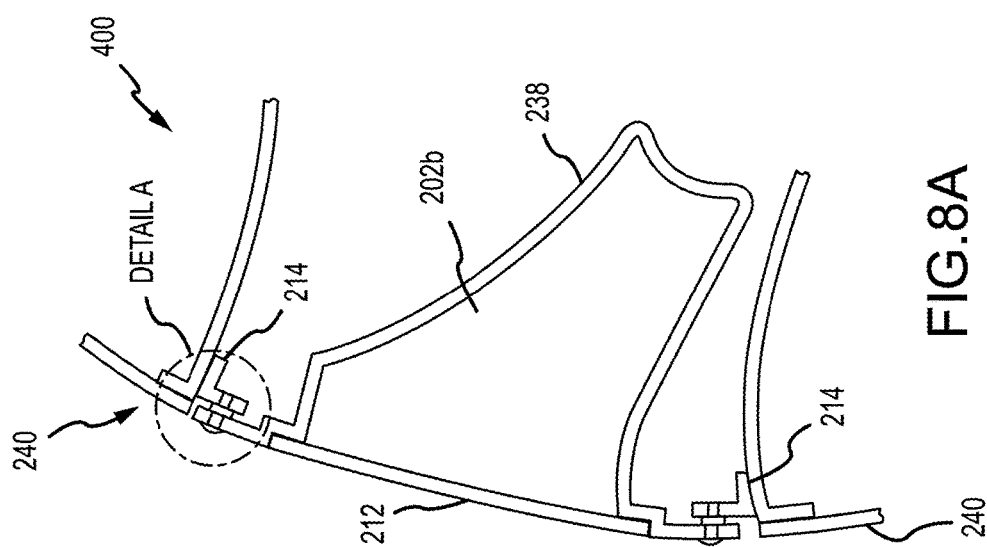

Referring now specifically to FIGS. 8A and 8B, one or more "L"-shaped brackets 214 may be mounted in the aircraft, adjacent the opening in the aircraft and inside the aircraft. In accordance with various embodiments, each load-bearing attachment assembly used to mount the structure within the aircraft exterior is held in place by a corresponding "L"-shaped bracket 214 and a fastener 216 such as a threaded attachment screw. The fastener is used to clamp the structure or a portion thereof (such as the mounting portion (exemplified by the flange portion of packboard compartment 202b) between the male fastening component and the female fastening component of the load-bearing attachment assembly (more particularly, between the first clamping surface of the male fastening component and the second clamping surface of the female fastening component) and to attach the structure to the aircraft as herein described.

Still referring to FIGS. 8A, 8B, and 9, according to various embodiments, the method 50 for mounting a structure to an aircraft continues by inserting, from the first side of the mounting portion of the structure, the first threaded portion of the male fastening component through one of the mounting openings in the mounting portion (step 120).

Still referring to FIGS. 8A, 8B, and 9, according to various embodiments, the method 50 for mounting a structure to an aircraft continues by positioning, from a second side of the mounting portion, the female fastening component to be cooperatively engaged with the male fastening component (step 130). The first aperture of the male fastening component and the second aperture of the female fastening component are positioned to align with the corresponding mounting opening in the mounting portion of the structure as shown in FIGS. 7A through 8B. In the depicted embodiment, the male fastening component is positioned adjacent a first side of the packboard compartment (more particularly, a first side of the flange portion) in alignment with one of the mounting openings therein. The cooperating female fastening component is positioned adjacent a second side of the flange portion of the packboard compartment in alignment with the male fastening component and the corresponding mounting opening in the flange portion. The male fastening component has the first threaded portion that extends through the mounting opening in the flange portion and is received in the second aperture of the female fastening component at least partially positioned on the second side of the flange portion of the packboard compartment. As the second side of the flange portion is on the inside of the aircraft, the female fastening component, once positioned, is not visible from outside the aircraft. The inboard side of the female fastening component bears directly against the aircraft (more particularly, against the L-shaped bracket inside the aircraft fuselage).

Still referring to FIGS. 8A, 8B, and 9, according to various embodiments, the method 50 for mounting a structure to an aircraft continues by passing the fastener through the aligned first aperture in the male fastening component and second aperture of the female fastening component, through the mounting opening, and into the aircraft (step 140). More particularly, the fastener is passed from outboard the aircraft, through the first aperture of the male fastening component, the second aperture of the female fastening component, through the aircraft exterior wall and through the L-shaped bracket (See FIG. 8B). FIG. 8B also illustrates that various embodiments may be used to mount a structure having a depth (thickness) that is less than the depth of the opening (e.g., a fuselage opening) in the aircraft, but mounting portion 200 (the flange portion in the depicted embodiment) is substantially flush with the exterior or outer surface 240 of the aircraft. The thickness of the annulus of the female fastening component may be adjusted to compensate for the decreased depth (thickness) of the structure such that the mounting portion may be substantially flush with the exterior or outer surface 240 of the aircraft, yet the weight of the structure has been reduced.

Still referring to FIGS. 8A, 8B, and 9, according to various embodiments, the method 50 for mounting a structure to an aircraft continues by rotatably tightening the fastener to cooperatively engage the male fastening component and the female fastening component to clamp the mounting portion between the first clamping surface of the male fastening component and the second clamping surface of the female fastening component and mount the structure to the aircraft with the female fastening component disposed against the aircraft and providing a load-bearing mounting platform for the structure (step 150). The fastener is secured inside the aircraft by the L-shaped bracket (step 160).

According to various embodiments, the two-parts (the male fastening component and the female fastening component) of the load-bearing attachment assembly clamps the mounting portion of the structure from the first side and the second side thereof and also forms a load-bearing mounting platform. As a result, the metallic load-bearing attachment assembly, instead of the fuselage-mounted structure itself, bears the compression load as indicated by multiple arrows L in FIG. 8B.

Referring now specifically to FIG. 10, according to various embodiments, a load bearing attachment assembly 10a coupled to a mounting portion 202 as illustrated in FIG. 7.

While mounting of a packboard compartment has been illustrated, it is to be understood that other structures may be mounted to the aircraft using various embodiments as described herein. For example, a permanent or removable panel may be mounted to the aircraft using various embodiments. Some non-limiting examples include panels and compartments used to form the aircraft skin and exterior and interior access panels that are removed for routine maintenance, or to gain access to portions of the fuselage that need to be opened by the crew.

From the foregoing, it is to be appreciated that the load-bearing attachment assembly according to various embodiments forms a strong, load-bearing and abrasion-resistant mounting platform for the structure permitting the structure to be spaced apart from the aircraft exterior to accommodate structures of varying thickness and type of honeycomb core and reduce wear/abrasion of the aircraft mounting surface. The load-bearing attachment assembly according to various embodiments permits lightweight, secure mounting of structures within the aircraft. Various embodiments substantially prevent damage to the structure and permit a reduction in the overall thickness and mass of the structure configured to be mounted to the aircraft exterior. Various embodiments provide a load-bearing metallic surface at each load-bearing attachment assembly without the need for creating bulky load-bearing features on the structure itself.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment" "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant arts) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mounting system comprising:
    a male fastening component comprising a radially-extending head, a first aperture, a cylindrical portion extending perpendicular to the radially-extending head, and a chamfer portion extending from the radially extending head to the cylindrical portion, the cylindrical portion having a first threaded portion circumferentially disposed on an outer surface of the cylindrical portion, an inboard surface of the radially-extending head comprising a first clamping surface, wherein the radially-extending head comprises a flat head, and wherein the first clamping surface is a first planar surface; and
    a female fastening component comprising an annulus enclosing a second aperture, at least two openings disposed on the annulus and configured to provide tooling access during assembly, a second clamping surface disposed on the annulus having a second planar surface extending from the second aperture to a perimeter of the annulus, and a second threaded portion circumferentially disposed on an inner surface perpendicular to the second clamping surface, and wherein the second planar surface is parallel to the first planar surface; and
    a structure to an aircraft having a mounting portion comprising a substantially flat mounting portion including a mounting opening that extends from the first side to the second side thereof, the mounting opening defining an inner surface, the female fastening component being cooperatively engaged with the male fastening component through the mounting opening, the chamfer portion disposed within the mounting opening and separated from the inner surface, the clamping surface engaging the substantially flat mounting portion, and a fastening extending through the male fastening component, the female fastening component, and the mounting portion of the structure.

2. The mounting system of claim 1, wherein the first threaded portion is configured to be cooperatively engaged with the second threaded portion of the female fastening component.

3. The mounting system of claim 1, wherein an outboard side of the annulus comprises the second clamping surface wherein the first threaded portion of the male fastening component and the second threaded portion of the female fastening component have complementary threads configured for cooperative engagement.

4. The mounting system of claim 3, wherein the male fastening component is configured to be at least partially positioned on a first side of the mounting portion of the structure and the female fastening component is configured to be at least partially positioned on a second side of the mounting portion, wherein the first clamping surface of the male fastening component and the second clamping surface of the female fastening component are configured for damping the mounting portion therebetween upon mounting the -to the aircraft, thereby transferring load to the female fastening component that is disposed against the aircraft.

5. The mounting system of claim 1, wherein the structure further comprises at least one of a panel or a compartment.

6. The mounting system of claim 5, wherein the structure comprises a packboard compartment and the mounting portion comprises a flange portion of the packboard compartment.

7. The mounting system of claim 1, wherein the at least two openings extend through the annulus.

8. The mounting system of claim 1, wherein the second clamping surface is a knurled surface.

\* \* \* \* \*